(12) United States Patent
Lawry et al.

(10) Patent No.: US 8,510,075 B2
(45) Date of Patent: Aug. 13, 2013

(54) EMMISSIVITY TEST INSTRUMENT FOR OVERHEAD ELECTRICAL TRANSMISSION AND DISTRIBUTION

(75) Inventors: Daniel Lawry, Alplaus, NY (US); Bernard Francis Fitzgerald, Schenectady, NY (US)

(73) Assignee: Electric Power Research Institute, Inc., Charlotte, NC (US)

( * ) Notice: Subject to any disclaimer, the term of this patent is extended or adjusted under 35 U.S.C. 154(b) by 642 days.

(21) Appl. No.: 12/565,821

(22) Filed: Sep. 24, 2009

(65) Prior Publication Data

US 2010/0076719 A1 Mar. 25, 2010

Related U.S. Application Data

(60) Provisional application No. 61/099,644, filed on Sep. 24, 2008.

(51) Int. Cl.
*G01N 25/00* (2006.01)
*G06F 15/00* (2006.01)
(52) U.S. Cl.
USPC ........................................................ 702/136

(58) Field of Classification Search
USPC ................ 702/130–136; 250/352; 436/147, 436/164; 374/9, 120, 121, 141, 142
See application file for complete search history.

(56) References Cited

U.S. PATENT DOCUMENTS

| 6,223,449 | B1 * | 5/2001 | Johnson et al. | 34/62 |
| 7,230,244 | B2 * | 6/2007 | Trotz et al. | 250/339.12 |
| 2007/0140401 | A1 * | 6/2007 | Jackson | 376/100 |
| 2007/0176102 | A1 * | 8/2007 | Slingerland et al. | 250/310 |

OTHER PUBLICATIONS

The EngineeringToolBox.com—www.engineeringtoolbox.com/radiation-heat-transfer-d_431.html.*

* cited by examiner

*Primary Examiner* — Sujoy Kundu
(74) *Attorney, Agent, or Firm* — Trego, Hines & Ladenheim, PLLC (57) ABSTRACT

This invention relates to an emissivity test instrument for measuring the emissivity of overhead electric transmission conductors. The emissivity test instrument includes a vacuum chamber, a data acquisition module connected to the vacuum chamber and adapted to receive data therefrom, and a computing device. The vacuum chamber is adapted to seat a test sample therein. The computing device is connected to the data acquisition module and is adapted to perform a test on a test sample and generate a test results report.

12 Claims, 9 Drawing Sheets

Emissivity Test Instrument

Test Setup Information

- Sample Name: Conductor Sample #1
- Conductor Diameter (in.): 1.001
- Years in Service: 15
- Report File Name: ETI_Report.html  [Browse]
- Comments/Notes:

- Conductor Type: Drake
- Conductor Length (in.): 16.0
- Operating Voltage (kV): 115
- Rating Temperature (C): 90.0

[Start Test]

Test Results & Status

- Heater Voltage (V):
- Ambient Temp (C):
- Start Time:
- Emissivity Estimate:
- Test Status: Stopped

- Heater Current (A):
- Conductor Temp (C):
- Elapsed Time (hh:mm):

- Heater Power (W):
- Vacuum (milliTorr):
- Remaining Time (hh:mm):

[Stop Test]

Emissivity Test Instrument

Test Setup Information

| | |
|---|---|
| Sample Name: | Conductor Sample #1 |
| Conductor Diameter (in.): | 1.001 |
| Years in Service: | 15 |
| Report File Name: | ETI_Report.html [Browse] |
| Comments/Notes: | |
| Conductor Type: | Drake |
| Conductor Length (in.): | 16.0 |
| Operating Voltage (kV): | 115 |
| Rating Temperature (C): | 90.0 |

[Start Test]

Test Results & Status

| | | |
|---|---|---|
| Heater Voltage (V): 27.27 | Heater Current (A): 0.496 | Heater Power (W): 13.52 |
| Ambient Temp (C): 23.1 | Conductor Temp (C) 93.0 | Vacuum (milliTorr): 4.88 |
| Start Time: 09:34:48 | Elapsed Time (hh:mm): 00:17 | Remaining Time (hh:mm): 01:48 |
| Emissivity Estimate: 0.953 | | |
| Test Status: | Adjusting heater power to reach rating temperature | |

[Stop Test]

EMISSIVITY TEST REPORT

| | |
|---|---|
| SAMPLE NAME: | HIGHLAND-LOGAN 07-128 |
| EMISSIVITY: | 0.621 |
| | |
| CONDUCTOR TYPE: | DRAKE |
| CONDUCTOR DIAMETER: | 1.001 IN |
| CONDUCTOR AGE: | 15.0 YEARS |
| CONDUCTOR OPERATING VOLTAGE: | 115.0 kV |
| CONDUCTOR SAMPLE LENGTH: | 16.10 IN |
| | |
| COMPLETION DATE (yyyy-mm-dd): | 2007-04-25 |
| COMPLETION TIME (hh:mm): | 16:31 |
| TEST DURATION (hh:mm): | 01:02 |
| INITIAL SAMPLE TEMPERATURE: | 27.4 DEGREES C |
| FINAL SAMPLE TEMPERATURE: | 89.9 DEGREES C |
| AMBIENT TEMPERATURE: | 23.1 DEGREES C |
| CHAMBER VACUUM: | 4.80 milliTorr |
| HEATER POWER: | 11.027 WATTS |
| THIS REPORT FILE: | 'HL128.PDF' |
| LOG FILE NAME: | 'HL128.CSV' |
| COMPLETION STATUS: | TEST STOPPED BY OPERATOR |
| USER COMMENTS: | SAMPLE OBTAINED AFTER JUNE 2006 RECONDUCTORING |

FIG. 9

EMMISSIVITY TEST INSTRUMENT FOR OVERHEAD ELECTRICAL TRANSMISSION AND DISTRIBUTION

This application claims the benefit of Provisional Application No. 61/099,644 filed on Sep. 24, 2009.

TECHNICAL FIELD AND BACKGROUND OF THE INVENTION

The present invention relates to the field of electrical conductors. In particular, the invention relates to the measurement of emissivity of overhead electric transmission conductors.

The power flow on an overhead transmission circuit is often limited by the thermal rating of the overhead conductor. This thermal rating is determined either statically or by one of a number of real-time techniques, including sag, tension, line temperature, or weather. Regardless of the technique used, the accuracy of the calculated rating is directly related to how accurately the emissivity and absorptivity of the conductor can be determined.

Figure 1:
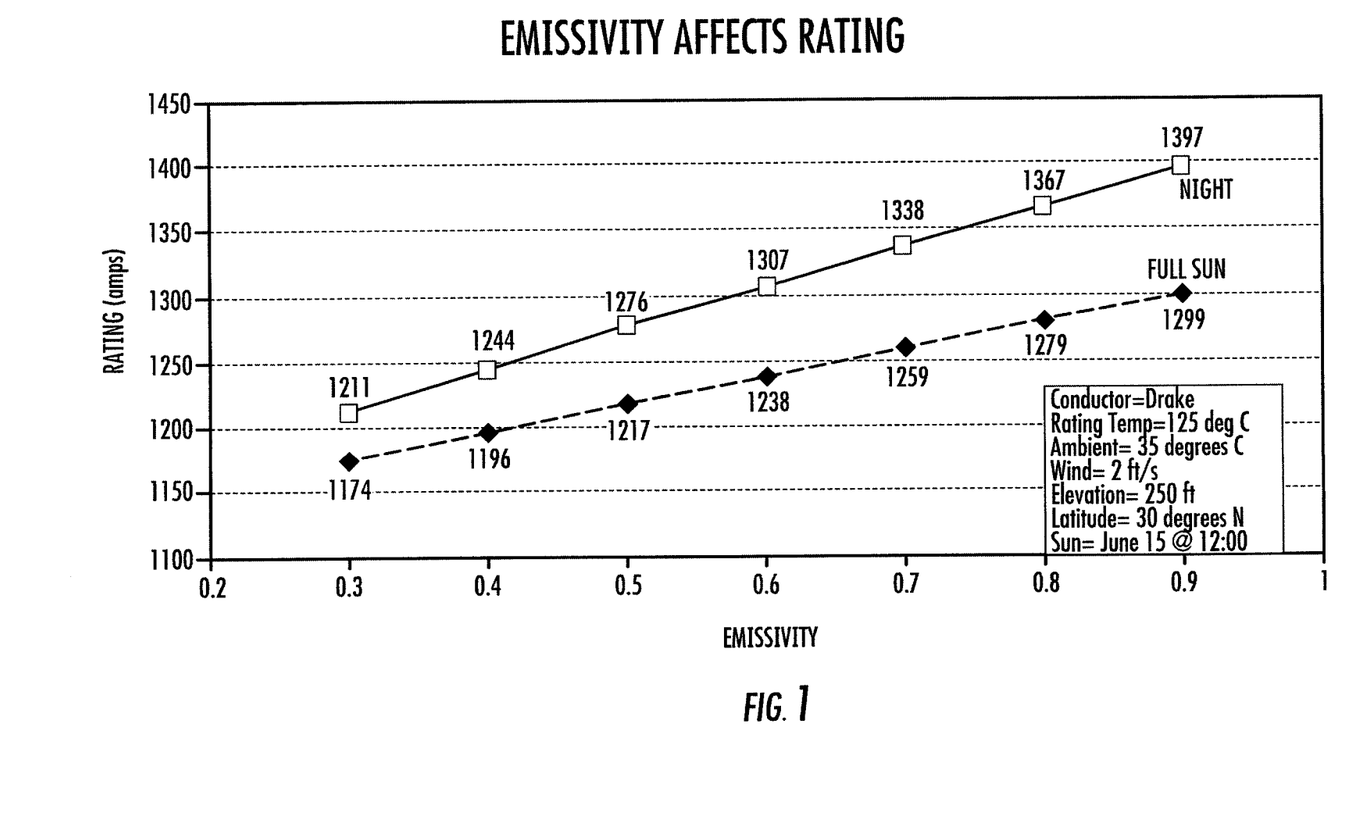
FIG. 1 shows the effect that emissivity has on the thermal rating of a conductor.

Emissivity and absorptivity are surface characteristics of the conductor. Emissivity is a measure of how well the conductor is able to cool itself by thermal radiation, while absorptivity is related to how much the conductor is heated by solar radiation. Currently, it is difficult to obtain an accurate measure of the emissivity and absorptivity of overhead conductors. As a result of this uncertainty, conservative emissivity and absorptivity values are typically assumed, and these values result in overly conservative thermal ratings. The effect that emissivity has on the thermal rating of an overhead conductor is shown in FIG. 1.

Current methods of determining emissivity of an overhead conductor include the use of infrared (IR) cameras. IR cameras, though, measure only a portion of the emissive wavelengths so total emissivity is not measured. Also, IR cameras measure over a narrow angular view so the measured emissivity approximates normal emissivity rather than hemispherical. For real surfaces, the normal emissivity will typically be greater than the hemispherical emissivity. Other emissivity measurement devices require a smooth perpendicular surface and are unable to perform on a round conductor. Further, stranding of a conductor complicates emissivity and absorptivity measurements.

SUMMARY OF THE INVENTION

These and other shortcomings of the prior art are addressed by the present invention, which provides a measurement device and method capable of providing an accurate measurement of emissivity of an overhead conductor.

According to one aspect of the present invention, an emissivity test instrument includes a vacuum chamber adapted to seal a test sample therein, a data acquisition module connected to the vacuum chamber and adapted to receive data therefrom, and a computing device connected to the data acquisition module and adapted to perform a test on the test sample and generate a test results report.

According to one aspect of the present invention, a method of determining the emissivity of overhead electric transmission conductors includes the steps of providing an emissivity test instrument, preparing a test sample for testing by the emissivity test instrument, running a test on the test sample, and collecting test data.

According to another aspect of the present invention, a method of determining the emissivity of overhead electric transmission conductors includes the steps of providing an emissivity test instrument, preparing a test sample for testing by the emissivity test instrument, placing the test sample in the vacuum chamber and sealing the test sample therein, initiating the computing device and running a test on the test sample, and determining the emissivity of the test sample. The emissivity test instrument includes a vacuum chamber, a data acquisition module, and a computing device.

BRIEF DESCRIPTION OF THE DRAWINGS

The invention may be best understood by reference to the following description in conjunction with the accompanying drawing figures in which.

DESCRIPTION OF THE PREFERRED EMBODIMENT AND BEST MODE

The emissivity ($\epsilon$) of a surface is the ratio of the radiant energy emitted by that surface to the radiant energy emitted by an ideal emitter (blackbody) at the same temperature. Thus, emissivity can be interpreted as an emission efficiency, with 0.00 representing a surface that emits no radiation and 1.00 representing a perfect emitter.

Absorptivity ($\alpha$) is a related quality which defines the percentage of radiant energy absorbed by a surface. A surface with an absorptivity of 0.00 would reflect all incident radiation while one with an absorptivity of 1.00 would absorb all incident radiation.

The qualitative effect of emissivity and absorptivity on thermal line rating is fairly intuitive. The thermal rating increases as emissivity increases, because the conductor is better able to cool itself by thermal radiation. Similarly, in the daytime, the thermal rating decreases as absorptivity increases, because the conductor absorbs more of the energy of direct and indirect sunlight. The quantitative effect of conductor emissivity and absorptivity on thermal rating is described in IEEE Std. 738, "IEEE Standard for Calculating the Current-Temperature Relationship of Bare Overhead Conductors".

It has been shown that emissivity and absorptivity increase from about 0.2 to about 0.9 with age. The exact rate of increase depends on the level of atmospheric pollution and the line's operating voltage. Absorptivity is generally higher than emissivity over the life of the conductor. Both values increase with age and atmospheric pollution. Values of 0.5 for both absorptivity and emissivity, or 0.9 for absorptivity and 0.7 for emissivity, have been used when the actual conductor surface condition is unknown.

Figure 2:
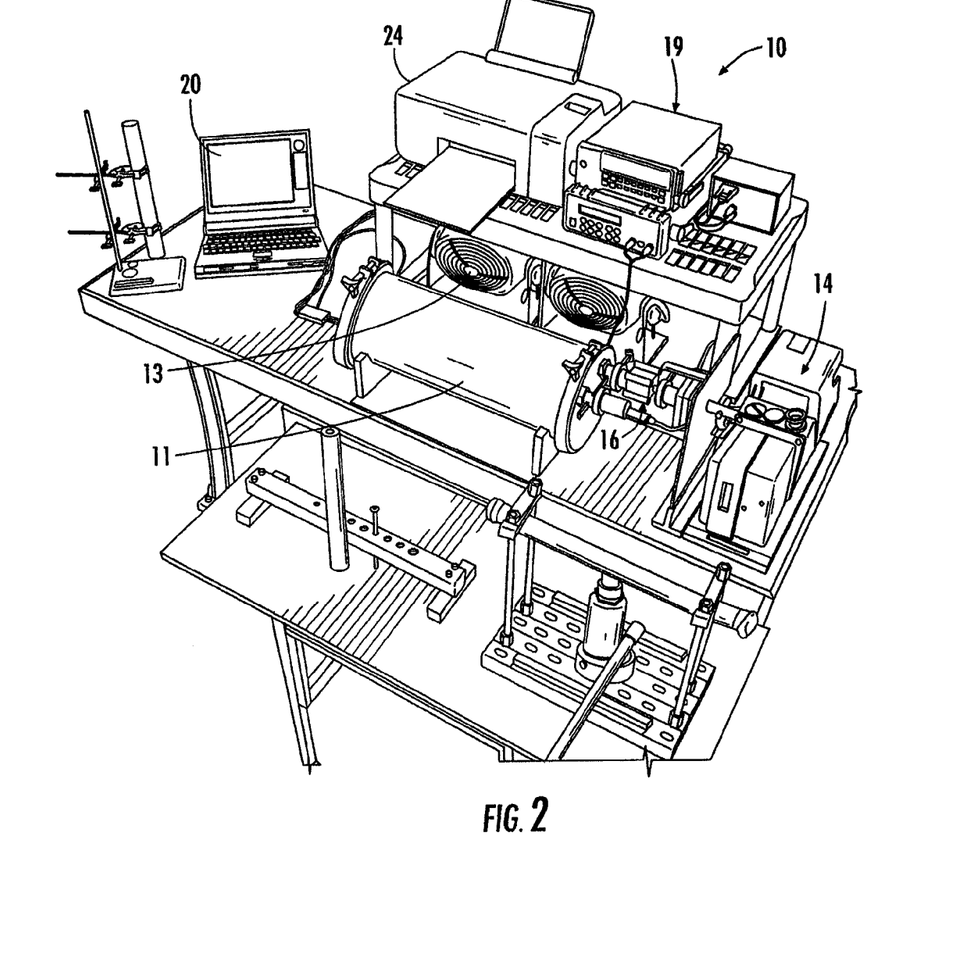
FIG. 2 shows an emissivity test instrument.
Figure 3:
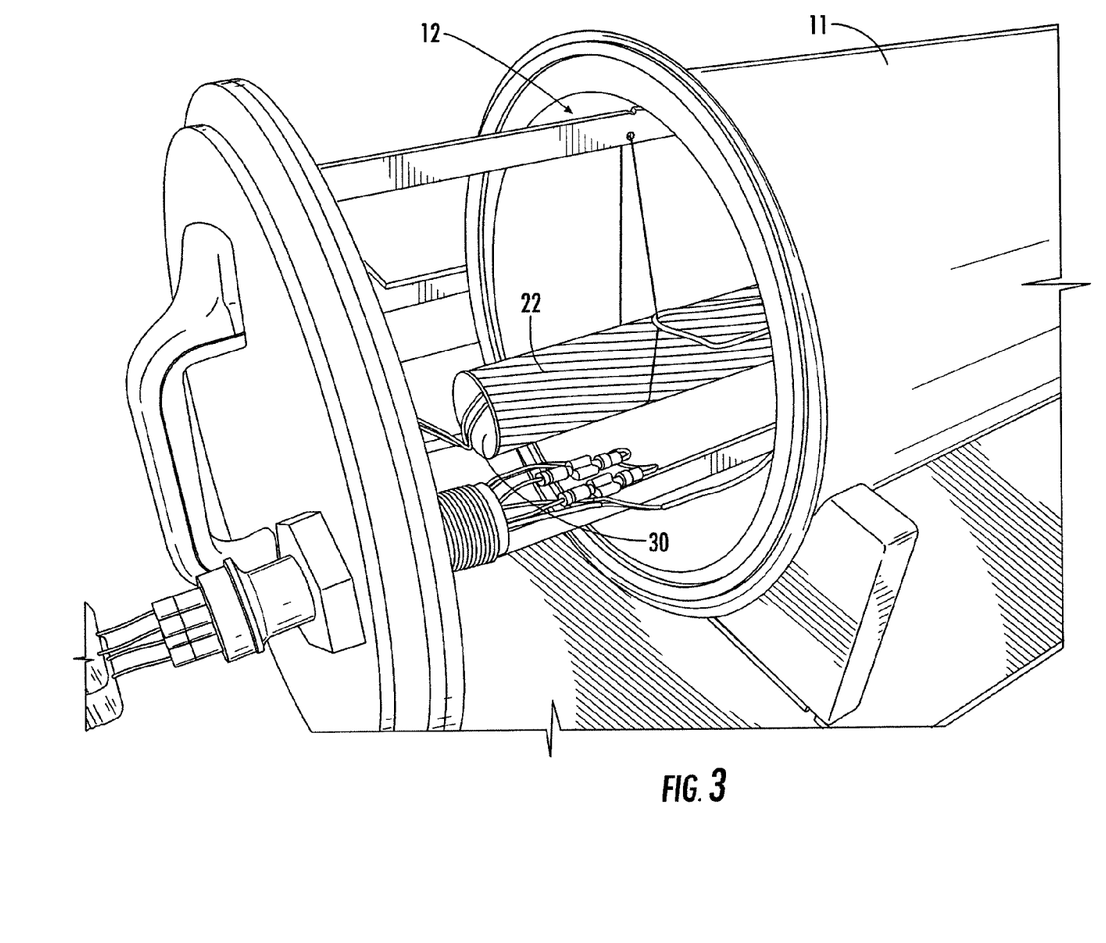
FIG. 3 shows a test sample being positioned in a vacuum chamber of the emissivity test instrument of FIG. 2.
Figure 4:
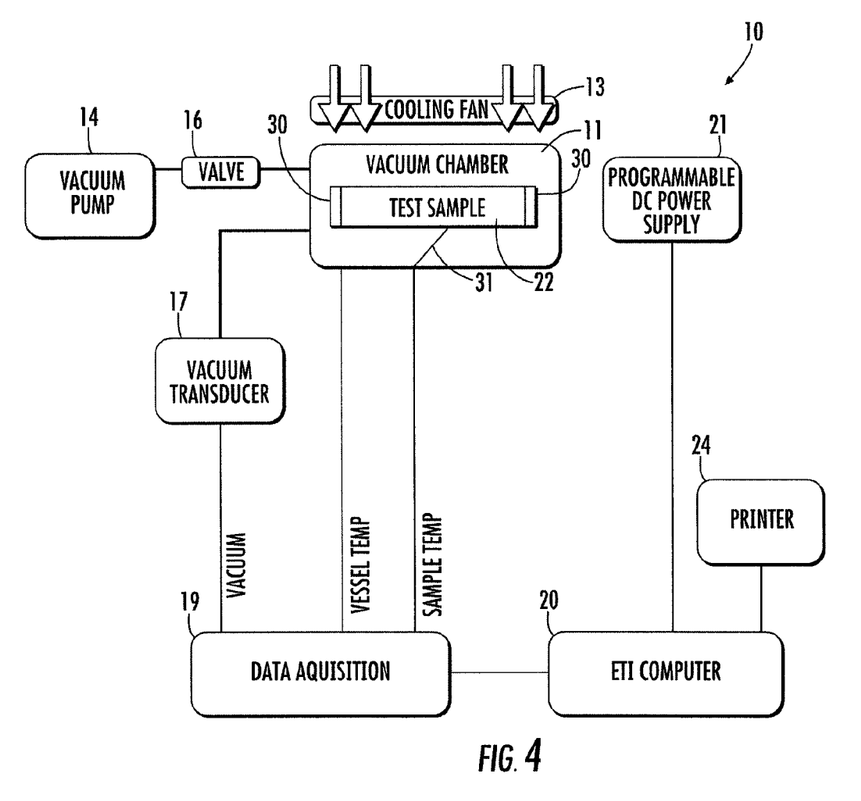
FIG. 4 is a block diagram of the test instrument of FIG. 2.

Referring now specifically to the drawings, an Emissivity Test Instrument (ETI) according to an embodiment of the invention is illustrated in FIGS. 2-4 and shown generally at reference numeral 10. The test instrument 10 includes a vacuum chamber 11 having a hanger 12 for securing a conductor test sample 22, cooling fans 13 to maintain the vacuum chamber 11 at a uniform temperature, a vacuum pump 14, a valve 16 to isolate the vacuum chamber 11 from the rest of the system, a vacuum transducer 17, and a trap 18 for preventing vapor from traveling from the pump 14 to the chamber 11.

A data acquisition module 19 for obtaining vacuum, vessel temp, and conductor temp values is connected to a control computing device 20 having test software. A programmable DC power supply 21 is also connected to the control computing device 20 and the vacuum chamber 11 to provide power to the instrument 10.

The test instrument 10 uses the radiated heat loss theory set forth in IEEE Std. 738-1993, which states that the radiated heat loss from a conductor is represented by:

$$q_r = 0.138 D\varepsilon \cdot \left[ \left( \frac{T_c + 273}{100} \right)^4 - \left( \frac{T_a + 273}{100} \right)^4 \right]$$

where $q_r$ is the radiated heat loss; D is the diameter of the conductor test sample 22 in inches; $\varepsilon$ is the emissivity of the conductor test sample 22; $T_c$ is the temperature of the conductor test sample 22 in degrees C.; and $T_a$ is the ambient temperature in degrees C. From this equation, the emissivity can be determined by measuring the conductor test sample 22 temperature, ambient temperature, and the radiated heat loss.

Because the radiated heat loss is difficult to measure due to convective heat loss, the sample 22 is placed into the vacuum chamber 11 of the test instrument 10. This allows the convective heat loss to be eliminated by sealing the sample 22 in a vessel and evacuating the vessel with a vacuum. With convective heat loss eliminated, the radiated heat loss can be determined, and the emissivity calculated.

In use, a user prepares the conductor sample 22, places it in the vacuum chamber 11, enters certain parameters into the computing device 20, and initiates software of the computing device 20 to perform the test. The test is done in vacuum to eliminate the complicated effects of convective cooling and results in cooling by radiation only, which is a straight forward function of emissivity, conductor temperature, and ambient temperature.

The sample 22 used in the test is of a suitable length, for example fifteen inches, to minimize errors caused by different heat transfer at the ends. The sample 22 is prepared by removing the inner strands/core of the sample 22 to allow a cylindrical cartridge heater 23 to be inserted into the sample 22, shown in FIG. 5. The sample 22 is banded using a bright-finish stainless steel wire to prevent the sample 22 from expanding, thereby maintaining the diameter of the sample 22 at its book value diameter. The sample 22 is also straightened if the sample has a bend in it to allow the heater to be inserted into the sample 22. Measurements of the sample length and diameter are taken to a high degree to minimize errors and thermally insulated end caps 30 are installed.

Figure 5:
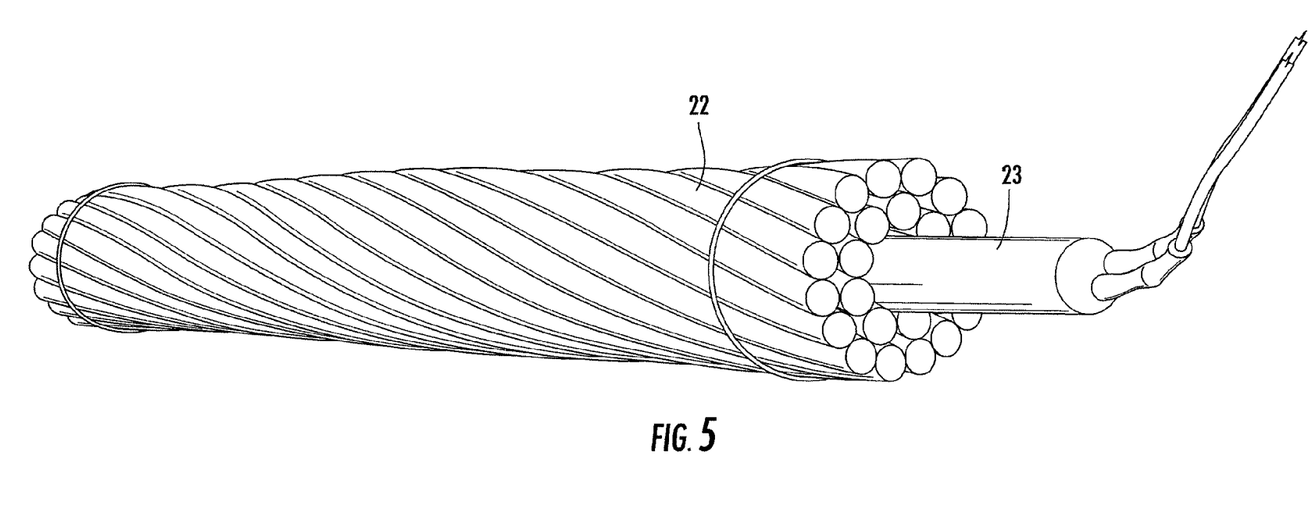
FIG. 5 shows a cartridge heater installed in a conductor sample.

The thermally insulated caps 30 are of a low emissivity (mirror like finish) material such as copper. A two-part epoxy is used to secure the caps 30 to the ends of the sample 22. The caps 30 further aid in minimizing errors during testing.

After a first one of the caps 30 is installed, the heater 23 is positioned within the sample 22. The heater 23 runs at a known power, and is equivalent to heating the sample 22 by current. A stainless steel powder is used to fill in the spaces between the heater 23 and the sample 22 to provide a good contact between the heater 23 and the sample 22 so that a good heat transfer is maintained between the two. The second one of the caps 30 is then installed on the sample 22.

A thermocouple 31 is used to measure the temperature of the outer layer of strands of the sample 22. A 30 gauge thermocouple wire is used to avoid disturbing the sample 22 temperature.

Figure 6:
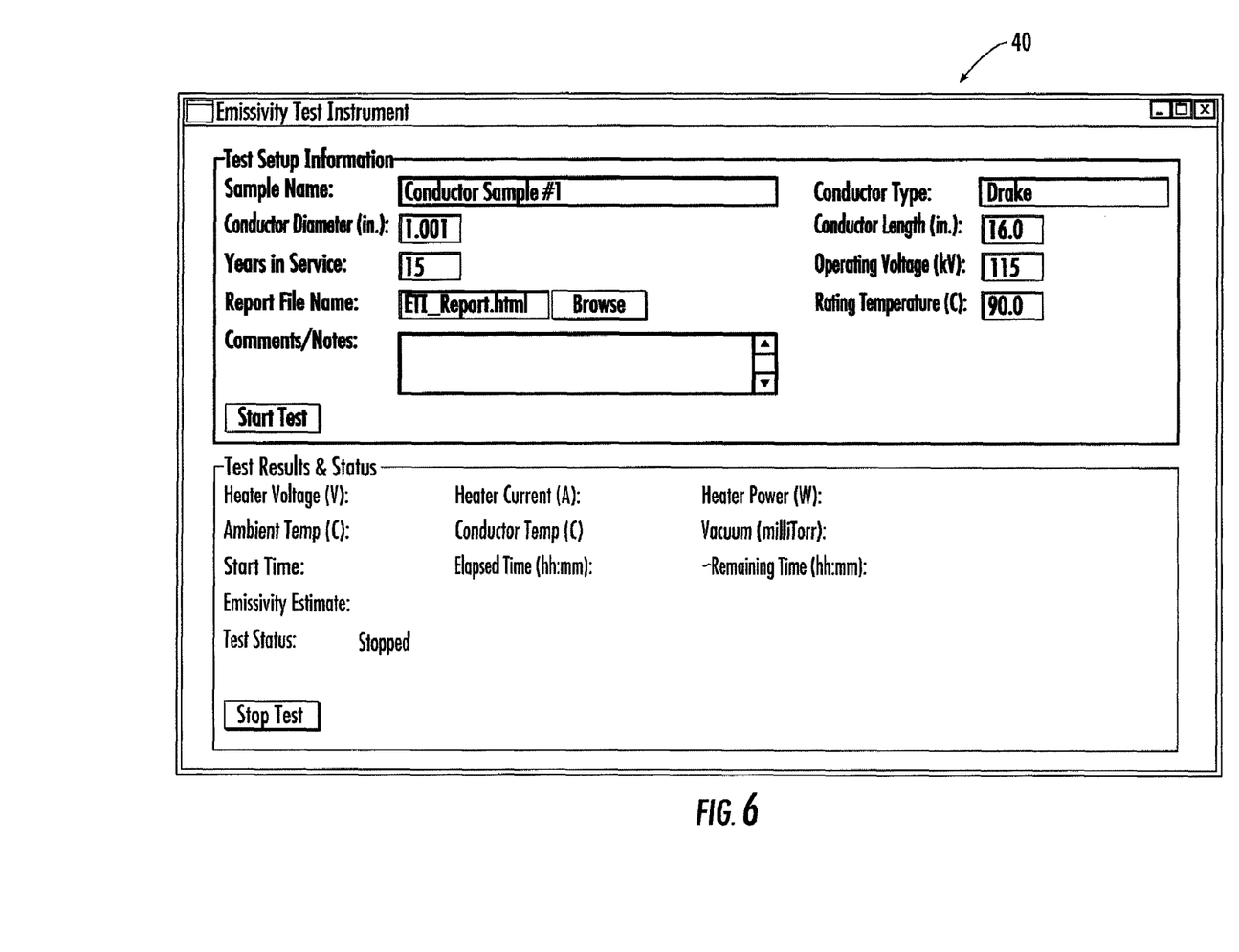
FIG. 6 shows a test panel of emissivity test instrument software installed on a computing device.
Figure 7:
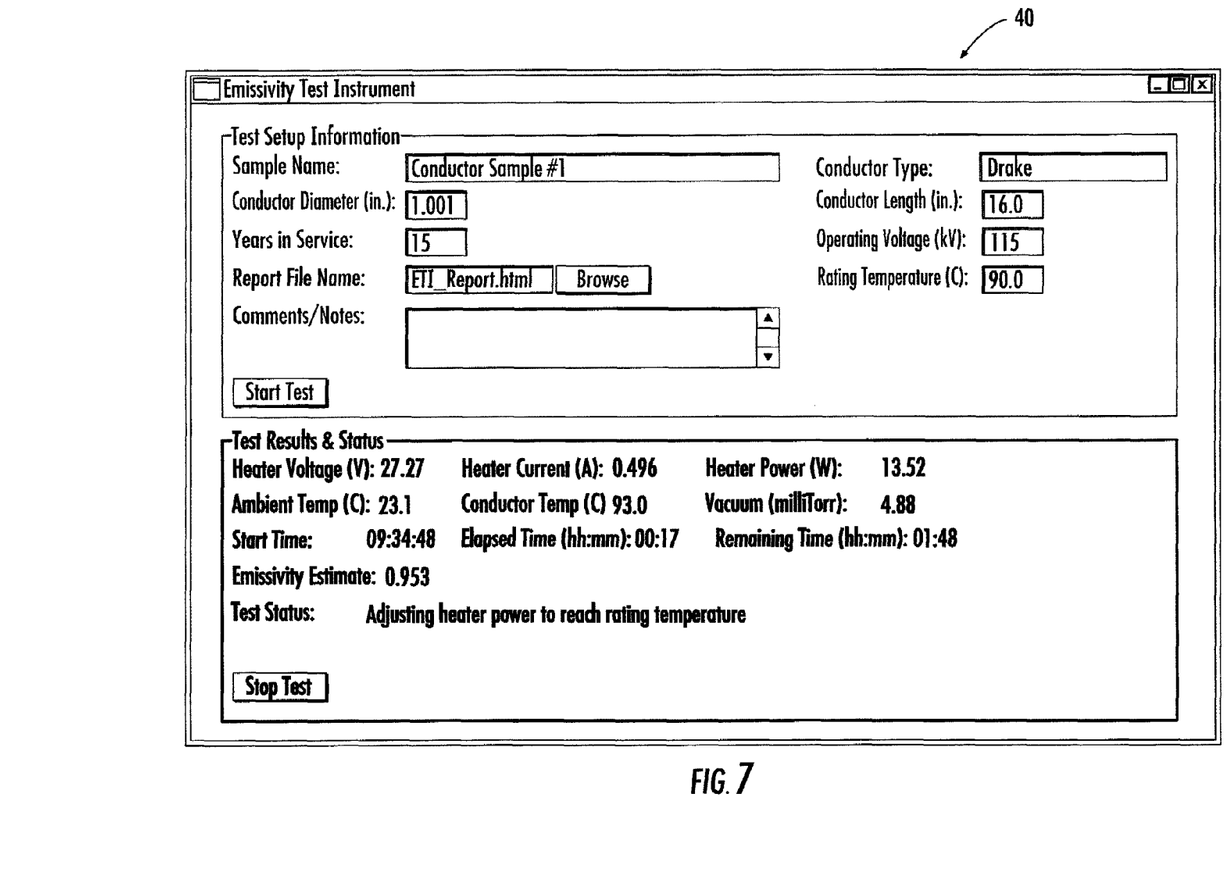
FIG. 7 shows test results and status displayed on the test panel of FIG. 6.

Once the sample 22 is prepared and placed in the vacuum chamber 11, a test can be run on the sample 22 to determine its properties. To start, the computing device 20, vacuum pump 14, valve 16, and fans 13, are turned to the on positions. After starting an Emissivity Test Instrument (ETI) software, an ETI panel 40, shown in FIG. 6, appears on the screen of the computing device 20. Information regarding the conductor sample 22 is inputted into the fields of the ETI panel 40. The information includes: Conductor Type, Conductor Diameter, Conductor Length, Years in Service, Operating Voltage, Report File Name, Rating Temperature, and Comments/Notes. Once all of the information has been entered, a start button 41 is selected to start the test. As shown in FIG. 7, once the test has started, the fields are disabled and the test results & status section of the ETI panel 40 activates.

Figure 8:
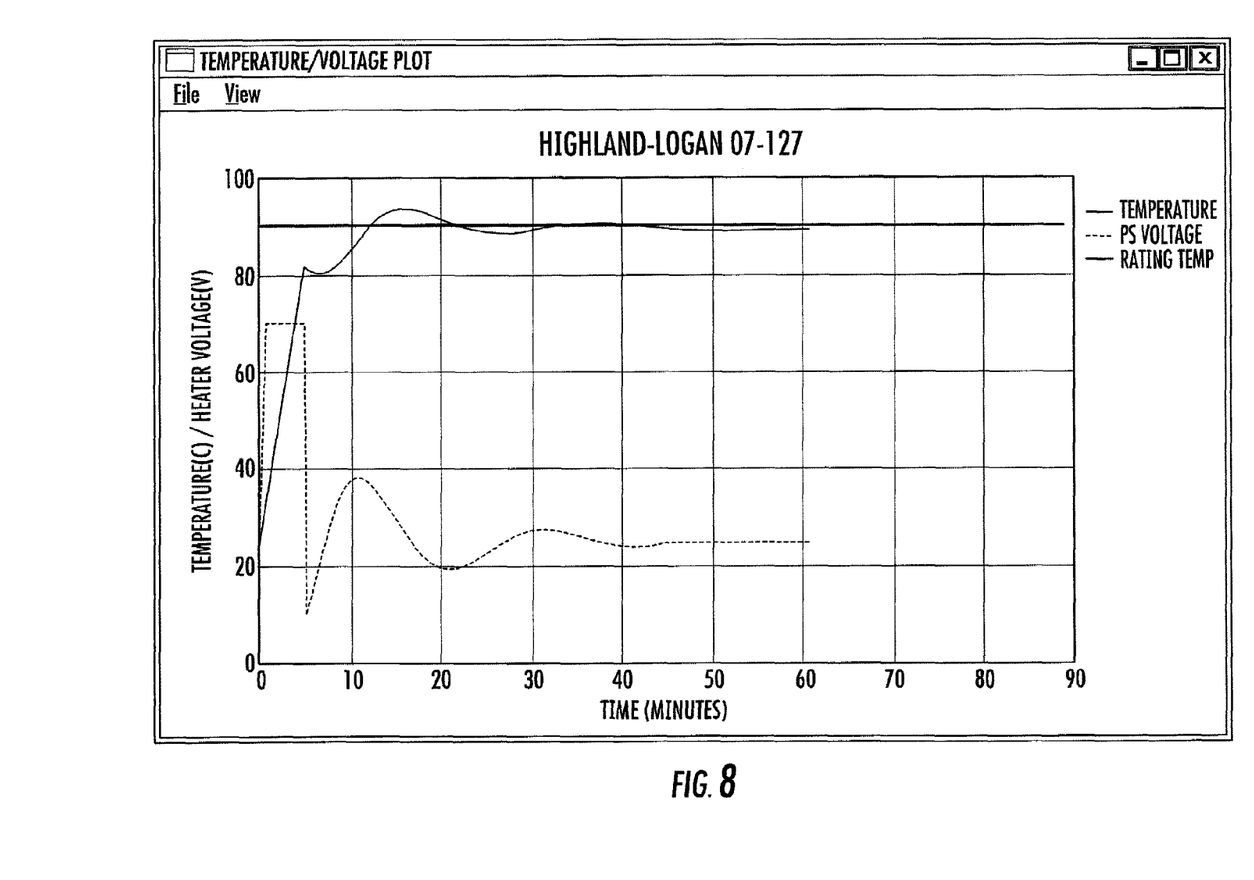
FIG. 8 shows a temperature voltage plot of test results.

The panel 40 allows a user to monitor the test as it progresses towards steady state. The user can monitor: Heater Voltage, Heater Current, Heater Power, Ambient Temperature, Conductor Temperature, Vacuum, Start Time, Elapsed Time, Remaining Time, Emissivity Estimate, and Test Status. In addition, a temperature voltage plot 43, FIG. 8, is shown to provide a user with a visual overview of the test.

Figure 9:
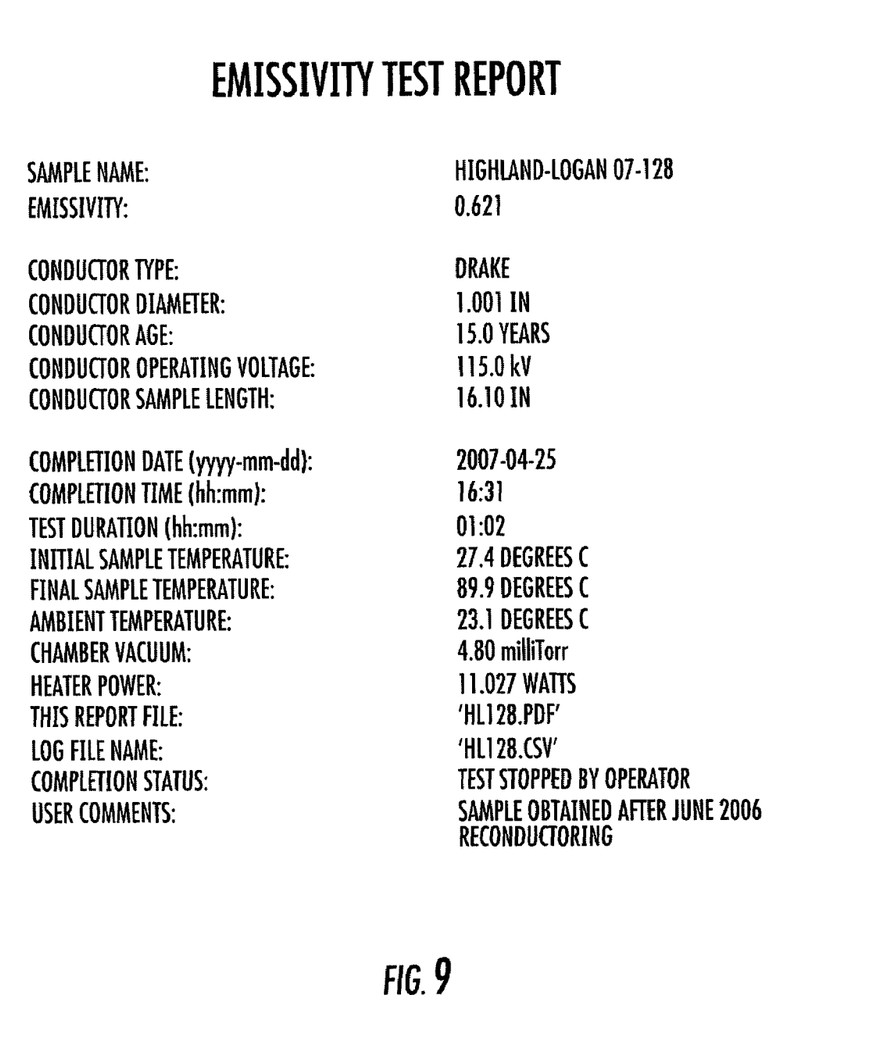
FIG. 9 shows a report generated by the software of FIG. 6.

Once the conductor sample 22 reaches the desired steady state temperature, the ambient temperature, conductor temperature, and power in the sample 22 are measured and the emissivity is determined by a heat balance calculation. Small adjustments are made by the computing device 20 for conductive heat losses through heater wires, thermocouple wire, and conductor sample supports 12 prior to calculating the emissivity. A report is then generated with the test results, shown in FIG. 9. The reports may be printed off using a printing device 24, FIGS. 2 and 4.

The ETI 10 operates in three stages as it attempts to heat the sample 22 to the rating temperature and maintain that temperature with constant heater power so that a steady state condition can be reached and a heat balance can be performed. The first stage is the Maximum Heat Stage. In this stage, the computing device 20 applies the maximum power to the sample heater until the sample reaches the temperature $T_{rating} - T_{anticipation}$. Once this temperature is reached, the computing device 20 moves the operation into a Controlled Heat Stage.

The Controlled Heat Stage allows the computing device 20 to periodically adjust the heater 23 power in order to identify the precise power level that results in the sample 22 reaching the operator-specified rating temperature. The test instrument 10 will remain in this stage until the sample temperature remains within the range:

$$(T_{rating} - 0.5) < T_{sample} < (T_{rating} - 0.5)$$

for twenty consecutive minutes. The final value of heater 23 power used during this stage will be used during a Constant Heat Stage.

The computing device 20 applies the last value of heater power used during the Controlled Heat Stage in order to achieve a steady-state condition at the approximate rating temperature. To ensure a steady state condition for the final reading, the computing device 20 will apply constant heat for twenty minutes. At the end of the twenty minutes, the test instrument 10 will review the acquired data to ensure that the following conditions were all met for the entire period:

1. Vacuum<5 millTorr for the entire period;
2. Sample temperature within +−0.2° C. of the mean sample temperature; and
3. Ambient temperature within +−0.2° C. of the mean ambient temperature. If all of the conditions are not met, the test instrument 10 will continue to apply constant power and acquire data until the test can run for twenty consecutive minutes while meeting all three of these criteria. The mean values of sample temperature and ambient temperature for the final 20 minutes will be used to calculate the final emissivity value.

An Emissivity Test Instrument and method are described above. Various details of the invention may be changed without departing from its scope. Furthermore, the foregoing description of the preferred embodiments of the invention and best mode for practicing the invention are provided for the purpose of illustration only and not for the purpose of limitation.

We claim:

1. A method of determining the emissivity of overhead electric transmission conductors, comprising the steps of:
   (a) providing an emissivity test instrument;
   (b) preparing a test sample for testing by the emissivity test instrument, wherein the test sample is prepared by:
      (i) removing an inner core of the test sample;
      (ii) inserting a heater into the test sample; and
      (iii) banding the test sample to prevent the test sample from expanding;
   (c) running a test on the test sample;
   (d) collecting test data; and
   (e) using the test data to determine the emissivity of the test sample using $$q_r = 0.138 D \varepsilon \cdot \left[ \left( \frac{T_c + 273}{100} \right)^4 - \left( \frac{T_a + 273}{100} \right)^4 \right].$$

where $q_r$ is the radiated heat loss, D is the diameter of the test sample in inches, $\varepsilon$ is the emissivity of the test sample, $T_c$ is the temperature of the test sample in degrees Celsius, and $T_a$ is the ambient temperature in degrees Celsius.

2. A method of determining the emissivity of overhead electric transmission conductors, comprising the steps of:
   (a) providing an emissivity test instrument having:
      (i) a vacuum chamber;
      (ii) a data acquisition module; and
      (iii) a computing device;
   (b) preparing a test sample for testing by the emissivity test instrument;
   (c) hanging the test sample in the vacuum chamber and sealing the test sample therein;
   (d) heating the test sample to a first stage of heat where the test sample reaches a temperature $T_{rating} - T_{anticipation}$, where $T_{rating}$ is equal to a temperature rating of the test sample and $T_{anticipation}$ is equal to a pre-determined temperature constant of the test sample;
   (e) initiating the computing device and running a test on the test sample; and
   (f) determining the emissivity of the test sample.

3. The method according to claim 2, wherein the step of preparing the test sample includes the steps of:
   (a) removing an inner core of the test sample;
   (b) inserting a heater into the test sample; and
   (c) banding the test sample to prevent the test sample from expanding.

4. The method according to claim 3, wherein the step of preparing the test sample further includes the steps of:
   (a) measuring a length of the test sample; and
   (b) measuring a diameter of the test sample.

5. The method according to claim 2, wherein the step of preparing the test sample includes the steps of:
   (a) removing an inner core of the test sample;
   (b) installing a first thermally insulated end cap on a first end of the test sample;
   (c) inserting a heater into the test sample;
   (d) installing a second thermally insulated end cap on a second end of the test sample; and
   (e) banding the test sample to prevent the test sample from expanding.

6. The method according to claim 2, further including the step of using the data acquisition module to receive data from the vacuum chamber.

7. The method according to claim 2, further including the step of creating a vacuum in the vacuum chamber to seal the test sample therein.

8. The method according to claim 2, further including the step of inputting data into the computing device.

9. The method according to claim 2, further including the step of heating the test sample to a second stage of heat where the test sample remains within a range $(T_{rating}-0.5) < T_{sample} < (T_{rating}-0.5)$.

10. The method according to claim 2, further including the step of heating the test sample to a third stage of heat where the test sample is held at a steady-state condition.

11. The method according to claim 2, further including the steps of:
    (a) inserting a heater into the test sample;
    (b) using the heater to apply maximum heat to the test sample until the test sample reaches the temperature $T_{rating}-T_{anticipation}$;
    (c) using the heater to apply a controlled heat to the test sample after the test sample has reached the temperature $T_{rating}-T_{anticipation}$ until the test sample has maintained the test sample in the range $(T_{rating}-0.5) < T_{sample} < (T_{rating}-0.5)$ for a specified period of time; and
    (d) using the heater to apply a constant heat for a specified period of time after the temperature of the test sample has been maintained in the range of $(T_{rating}-0.5) < T_{sample} < (T_{rating}-0.5)$.

12. The method according to claim 2, further including the step of measuring ambient temperature, test sample temperature, and power in the test sample.

* * * * *